US011599775B2

(12) United States Patent
Neagovici et al.

(10) Patent No.: US 11,599,775 B2
(45) Date of Patent: *Mar. 7, 2023

(54) DETECTING USER INTERFACE ELEMENTS IN ROBOTIC PROCESS AUTOMATION USING CONVOLUTIONAL NEURAL NETWORKS

(71) Applicant: UiPath, Inc., New York, NY (US)

(72) Inventors: Mircea Neagovici, Bucharest (RO); Stefan Adam, Bucharest (RO); Virgil Tudor, Bucharest (RO); Dragos Bobolea, Bucharest (RO)

(73) Assignee: UiPath, Inc., New York, NY (US)

( * ) Notice: Subject to any disclaimer, the term of this patent is extended or adjusted under 35 U.S.C. 154(b) by 198 days.

This patent is subject to a terminal disclaimer.

(21) Appl. No.: 17/209,601

(22) Filed: Mar. 23, 2021

(65) Prior Publication Data
US 2021/0209449 A1 Jul. 8, 2021

Related U.S. Application Data

(63) Continuation of application No. 16/595,727, filed on Oct. 8, 2019, now Pat. No. 10,990,876.

(51) Int. Cl.
*G06F 17/18* (2006.01)
*G06N 3/04* (2023.01)
(Continued)

(52) U.S. Cl.
CPC ....... *G06N 3/0472* (2013.01); *G06F 9/45512* (2013.01); *G06F 17/15* (2013.01);
(Continued)

(58) Field of Classification Search
CPC .. G06N 3/0472; G06N 3/0481; G06N 3/0454; G06N 3/08; G06N 3/008;
(Continued)

(56) References Cited

U.S. PATENT DOCUMENTS 9,858,496 B2 1/2018 Sun et al.
10,890,898 B2 * 1/2021 Akella .................... G06F 30/20
(Continued)

FOREIGN PATENT DOCUMENTS

CN 109685100 A 4/2019
CN 109697442 A 4/2019
(Continued)

OTHER PUBLICATIONS

U.S. Appl. No. 16/595,727, filed Oct. 8, 2019, Mircea Neagovici.
(Continued)

*Primary Examiner* — Charlotte M Baker
(74) *Attorney, Agent, or Firm* — LeonardPatel PC; Michael A. Leonard, II; Sheetal S. Patel (57) ABSTRACT

Graphical elements in a user interface (UI) may be detected in robotic process automation (RPA) using convolutional neural networks (CNNs). Such processes may be particularly well-suited for detecting graphical elements that are too small to be detected using conventional techniques. The accuracy of detecting graphical elements (e.g., control objects) may be enhanced by providing neural network-based processing that is robust to changes in various UI factors, such as different resolutions, different operating system (OS) scaling factors, different dots-per-inch (DPI) settings, and changes due to UI customization of applications and websites, for example.

20 Claims, 8 Drawing Sheets

(51) Int. Cl.
*G06F 9/455* (2018.01)
*G06F 17/15* (2006.01)
*G06T 7/11* (2017.01)

(52) U.S. Cl.
CPC ........... *G06F 17/18* (2013.01); *G06N 3/0481* (2013.01); *G06T 7/11* (2017.01); *G06T 2207/20132* (2013.01)

(58) Field of Classification Search
CPC ...... G06F 9/45512; G06F 17/15; G06F 17/18; G06T 7/11; G06T 2207/20132; G06T 2207/20081; G06T 2207/20084; G06V 10/764; G06V 10/7747; G06V 10/82; G06K 9/6257; G06K 9/6271
USPC .......................................................... 706/15
See application file for complete search history.

(56) References Cited

U.S. PATENT DOCUMENTS

| | | |
|---|---|---|
| 2007/0271552 A1 | 11/2007 | Pulley |
| 2016/0203380 A1 | 7/2016 | Bulan et al. |
| 2016/0307061 A1 | 10/2016 | Bulan et al. |
| 2017/0206431 A1 | 7/2017 | Sun et al. |
| 2018/0157386 A1 | 6/2018 | Su |
| 2018/0189609 A1 | 7/2018 | Park et al. |
| 2018/0197123 A1 | 7/2018 | Parimelazhagan et al. |
| 2019/0163499 A1 | 5/2019 | Kebets et al. |
| 2019/0205638 A1 | 7/2019 | Zhang et al. |
| 2019/0311210 A1 | 10/2019 | Chatterjee et al. |
| 2020/0320786 A1* | 10/2020 | Kadoury .............. A61B 5/4566 |

FOREIGN PATENT DOCUMENTS

| | | |
|---|---|---|
| CN | 110135427 A | 8/2019 |
| KR | 1020190095651 A | 8/2019 |
| WO | 2019068141 A1 | 4/2019 |

OTHER PUBLICATIONS

U.S. Appl. No. 16/700,494, filed Dec. 2, 2019, Dorin Andrei Laza.
Charlotte M Baker, "Notice of Allowance", dated Mar. 3, 2021, U.S. Appl. No. 16/595,727.
I. Zeki Yalniz et al., "Billion-scale semi-supervised learning for state-of-the-art image and video classification," available at https://ai.facebook.com/blog/billion-scale-semi-supervised-learning/ (published Oct. 18, 2019).
International Search Report and Written Opinion of the International Search Authority (KIPO) issued for PCT Application No. PCT/US2020/045830 dated Nov. 11, 2020.
International Search Report and Written Opinion of the International Search Authority issued by the Korean Intellectual Property Office (KIPO) dated Nov. 30, 2020.
Kevin Moran et al., "Machine Learning-Based Prototyping of Graphical User Interfaces for Mobile Apps.," IEEE Transactions On Software Engineering, pp. 1-26 (May 2018).
Raja Bala et al., "Image simulation for automatic license plate recognition," Proc. of SPIE-IS&T, vol. 8305, pp. 83050Z-1 to 83050Z-9 (2012).
Saad Hassan et al., "Extraction and Classification of User Interface Components from an Image," International Journal of Pure and Applied Mathematics, vol. 118, No. 24 (2018).
Shaoqing Ren et al., "Faster R-CNN: Towards Real-Time Object Detection with Region Proposal Networks," Advances in Neural Information Processing Systems 28, published at the Neural Information Processing Systems (NIPS) Conference (2015).
Shaoqing Ren et al., "Faster R-CNN: Towards Real-Time Object Detection with Region Proposal Networks," Microsoft Research, pp. 1-9 (Jun. 4, 2015).
Tensorflow models available at https://github.com/tensorflow/models/tree/master/research/object_detection (last accessed Aug. 12, 2019).
UiPath, Inc., UiPath Studio—Basic Concepts YouTube Video, available at https://www.youtube.com/watch?v=dDbiQpA7S0 (Jul. 22, 2014).
Viswanath Sivakumar et al., "Rosetta: Understanding text in images and videos with machine learning," available at https://engineering.fb.com/ai-research/rosetta-understanding-text-in-images-and-videos-with-machine-learning/ (posted Sep. 11, 2018).
Xiao-Yun Zhou et al., "Atrous Convolutional Neural Network (ACNN) for Semantic Image Segmentation with full-scale Feature Maps," available at https://arxiv.org/pdf/1901.09203.pdf (last accessed Aug. 12, 2019).
Mark Roz, "Restriction Requirement", dated May 17, 2021, U.S. Appl. No. 16/700,494.
Mark Roz, "Notice of Allowance", dated Sep. 9, 2021, U.S. Appl. No. 16/700,494.

* cited by examiner

RELATED ART

FIG. 1

Faster R-CNN for Graphical Element Detection

DETECTING USER INTERFACE ELEMENTS IN ROBOTIC PROCESS AUTOMATION USING CONVOLUTIONAL NEURAL NETWORKS

CROSS REFERENCE TO RELATED APPLICATION

This application is a continuation of, and claims the benefit of, U.S. patent application Ser. No. 16/595,727 filed Oct. 8, 2019. The subject matter of this earlier filed application is hereby incorporated by reference in its entirety.

FIELD

The present invention generally relates to Robotic Process Automation (RPA), and more specifically, to detecting user interface (UI) elements in RPA using convolutional neural networks (CNNs).

BACKGROUND

Robotic process automation (RPA) allows automation of the execution of repetitive and manually intensive activities. RPA can be used, for example, to interact with software applications through a user interface (UI), similar to how a human being would interact with the application. Interactions with the UI were typically performed by an RPA application using application programming interface (API) calls to a function that returns a set of coordinates (i.e., a "selector"). The RPA application can then use this information to simulate a mouse click of a button, for example, that causes the target application to act as if the user had manually clicked on the button.

Per the above, in a typical RPA implementation for native computing systems, the selectors work using the underlying properties of the graphical elements of the UI to identify graphical elements in the application (e.g., buttons, text fields, etc.). However, this technique breaks down when trying to automate the same software in VDEs, such as those provided by Citrix®, VMWare®, VNC®, and Windows® (Windows® Remote Desktop). The reason for the breakdown is that VDEs stream an image of the remote desktop in a similar manner to how video streaming services do. There are simply no selectors to be identified in the images (i.e., "frames") of the video. The RPA application thus cannot make an API call to determine the location of a graphical element to be provided to the application, for example. Attempts have been made to solve this challenge using optical character recognition (OCR) and image matching for VDE scenarios. However, these techniques have proven to be insufficiently reliable and have caused maintenance issues since even minor changes in the UI tend to break the automations.

Computer Vision™ (CV) by UiPath®, for example, solves this problem by using a mix of artificial intelligence (AI), OCR, text fuzzy-matching, and an anchoring system. A CV model identifies the specific graphical elements in the image. This provides more accurate identification of graphical elements, such as text fields, buttons, check boxes, icons, etc.

To recognize graphical elements, AI algorithms, such as Faster Region-based Convolutional Neural Network (R-CNN), may be used. See, for example, Shaoqing Ren et al., Faster R-CNN: Towards Real-Time Object Detection with Region Proposal Networks, arXiv:1506.01497v3 (submitted Jun. 4, 2015). Faster R-CNN passes images of the target application interface through a ResNet with dilated convolutions (also called atrous convolutions) that output feature maps or tensors (i.e., a smaller image with 2048 channels). These feature maps are further passed through another neural network a region proposal network (RPN) that proposes thousands of possible rectangles where a graphical element of interest is believed to potentially have been found, as well as guesses with respect to what regions are believed to be graphical elements as a list of coordinates. The feature maps are grids and there are proposals (also called anchors) for each square on the grid. For each anchor, the RPN provides a classification. Further, there is a graphical element match score between 0 and 1 and a regression part indicating how far an anchor would need to be moved to match a particular graphical element. In other words, the RPN outputs regions where it thinks it found graphical elements, as well as what these graphical elements are believed to potentially be and associated probabilities.

Figure 1:
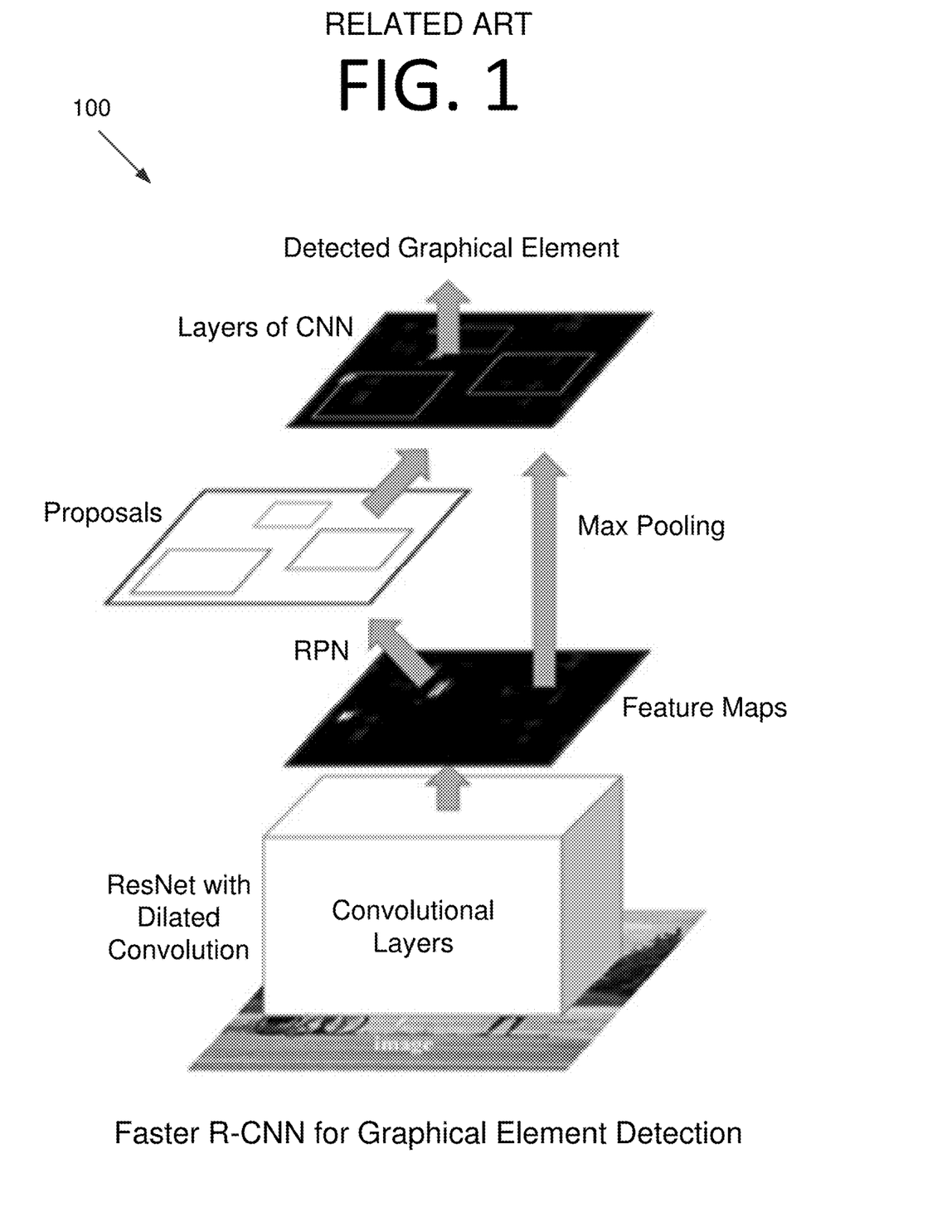
FIG. 1 illustrates an implementation of Faster R-CNN.

With these proposals, many crops are made from the feature tensors output from the backbone ResNet. In these large feature tensors, feature dimensions are cropped. Cropped boxes are then passed again through a few layers of the CNN, which can output a more precise location and class distribution. Such Faster R-CNN 100 for graphical element detection is shown in FIG. 1.

However, due to this repeated cropping, certain smaller graphical elements may not have a representative pixel by the end of the process. For instance, passing a 2048×1024 input image through a ResNet backbone that produces a feature map with 2048 channels with a standard stride of 32 that reduces dimensionality by a factor of two each time, a 10×10 checkbox, for example, would not have a representative pixel by the end of the ResNet process. Also, changes to resolutions, operating system (OS) scaling factors, dots-per-inch (DPI) settings, and changes due to UI customization of applications and websites, for example, are difficult to accommodate using current techniques. Accordingly, an improved UI element detection approach may be beneficial.

SUMMARY

Certain embodiments of the present invention may provide solutions to the problems and needs in the art that have not yet been fully identified, appreciated, or solved by current image analysis techniques. For example, some embodiments of the present invention pertain to detecting UI elements in RPA using CNNs. Some embodiments enhance the accuracy of detecting graphical elements (e.g., control objects) by providing neural network-based processing that is robust to changes in various UI factors, such as different resolutions, different OS scaling factors, different DPI settings, and changes due to UI customization of applications and websites, for example.

In an embodiment, a computer program is embodied on a non-transitory computer-readable medium, the program is configured to cause at least one processor to create a raw dataset by collecting images directly from an environment on which a CNN will operate and augment the raw dataset to produce an augmented dataset. The program is also configured to cause the at least one processor to train the CNN using the augmented dataset and detecting graphical elements in a UI using the trained CNN.

In another embodiment, a computer-implemented method includes augmenting, by a computing system, a raw dataset using channel randomization, hue shift, color inversion, random cropping, random scaling, blurring of images, or any combination thereof, to produce an augmented dataset.

The computer-implemented method also includes training a CNN, by the computing system, using the augmented dataset. The computer-implemented method further includes detecting graphical elements in a UI, by the computing system, using the trained CNN.

In yet another embodiment, a system includes memory storing computer program instructions and at least one processor configured to execute the computer program instructions. The at least one processor is configured to detect graphical elements in a UI using a Faster R-CNN network. The detection includes overlaying rectangles over an image as a grid and providing a predetermined number of proposals for each rectangle in the grid. The proposals include a scale and a stride distance. The stride distance defines a distance between the rectangles. Each time two rectangles are compared, an intersection over a union or an intersection over a minimum is used with a given threshold. The threshold is an adaptive threshold that depends on an area of a given rectangle.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to detecting UI elements in RPA using CNNs. This process may be particularly well-suited for detecting graphical elements that are too small to be detected using conventional techniques. For instance, in some UIs, checkboxes may vary in size between 8×8 pixels and 32×32 pixels and edit boxes may vary between 20×10 pixels and 3500×32 pixels, for example. However, graphical elements of any size may be detected in some embodiments without deviating from the scope of the invention. Indeed, some embodiments enhance the accuracy of detecting graphical elements (e.g., control objects) by providing neural network-based processing that is robust to changes in various UI factors, such as different resolutions (e.g., 800× 600 to 3840×2160 and beyond), different OS scaling factors (e.g., 75% to 200%), different DPI settings, and changes due to UI customization of applications and websites, for example.

Per the above, in some embodiments, video images may come from a VDE server, and may be of a visual display or a part thereof. Some example VMs include, but are not limited to, those provided by Citrix®, VMWare®, VNC®, Windows® Remote Desktop, etc. However, images may also come from other sources, including, but not limited to, Flash, Silverlight, or PDF documents, image files of various formats (e.g., JPG, BMP, PNG, etc.), or any other suitable image source without deviating from the scope of the invention. Such images may include, but are not limited to, a window, a document, a financial receipt, an invoice, etc.

Figure 2:
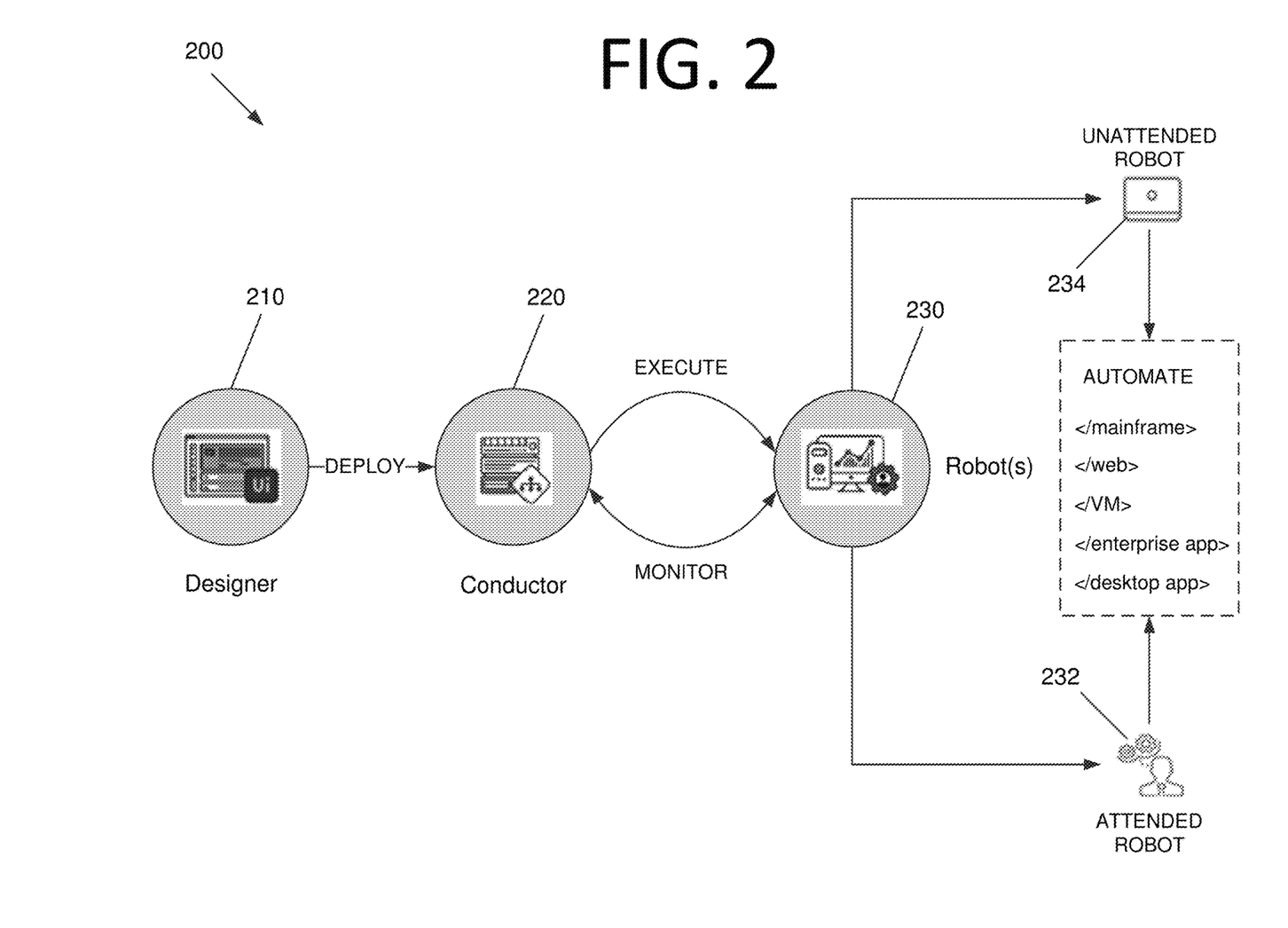
FIG. 2 is an architectural diagram illustrating an RPA system, according to an embodiment of the present invention.

FIG. 2 is an architectural diagram illustrating an RPA system 200, according to an embodiment of the present invention. RPA system 200 includes a designer 210 that allows a developer to design and implement workflows. Designer 210 may provide a solution for application integration, as well as automating third-party applications, administrative Information Technology (IT) tasks, and business IT processes. Designer 210 may facilitate development of an automation project, which is a graphical representation of a business process. Simply put, designer 210 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 210 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 230 that execute the workflows developed in designer 210. One commercial example of an embodiment of conductor 220 is UiPath Orchestrator™. Conductor 220 facilitates management of the creation, monitoring, and deployment of resources in an environment. Conductor 220 may act as an integration point with third-party solutions and applications.

Conductor 220 may manage a fleet of robots 230, connecting and executing robots 230 from a centralized point. Types of robots 230 that may be managed include, but are not limited to, attended robots 232, unattended robots 234, development robots (similar to unattended robots 234, but used for development and testing purposes), and nonproduction robots (similar to attended robots 232, but used for development and testing purposes). Attended robots 232 are triggered by user events and operate alongside a human on the same computing system. Attended robots 232 may be used with conductor 220 for a centralized process deployment and logging medium. Attended robots 232 may help the human user accomplish various tasks, and may be triggered by user events. In some embodiments, processes cannot be started from conductor 220 on this type of robot and/or they cannot run under a locked screen. In certain embodiments, attended robots 232 can only be started from a robot tray or from a command prompt. Attended robots 232 should run under human supervision in some embodiments.

Unattended robots 234 run unattended in virtual environments and can automate many processes. Unattended robots 234 may be responsible for remote execution, monitoring, scheduling, and providing support for work queues. Debugging for all robot types may be run in designer 210 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 220 may have various capabilities including, but not limited to, provisioning, deployment, configuration, queueing, monitoring, logging, and/or providing interconnectivity. Provisioning may include creating and maintenance of connections between robots 230 and conductor 220 (e.g., a web application). Deployment may include assuring the correct delivery of package versions to assigned robots 230 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 220 may provide interconnectivity by acting as the centralized point of communication for third-party solutions and/or applications.

Robots 230 are execution agents that run workflows built in designer 210. One commercial example of some embodiments of robot(s) 230 is UiPath Robots™ In some embodiments, robots 230 install the Microsoft Windows® Service Control Manager (SCM)-managed service by default. As a result, such robots 230 can open interactive Windows® sessions under the local system account, and have the rights of a Windows® service.

In some embodiments, robots 230 can be installed in a user mode. For such robots 230, this means they have the same rights as the user under which a given robot 230 has been installed. This feature may also be available for High Density (HD) robots, which ensure full utilization of each machine at its maximum potential. In some embodiments, any type of robot 230 may be configured in an HD environment.

Robots 230 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 230 are executed). These services are trusted with and manage the credentials for robots 230. A console application is launched by the SCM under the local system.

User mode robot services in some embodiments manage and monitor Windows® sessions and act as a proxy between conductor 220 and the execution hosts. User mode robot services may be trusted with and manage the credentials for robots 230. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 230 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 210 may also be independent of browser zoom level in some embodiments. For applications that are DPI-unaware or intentionally marked as unaware, DPI may be disabled in some embodiments.

Figure 3:
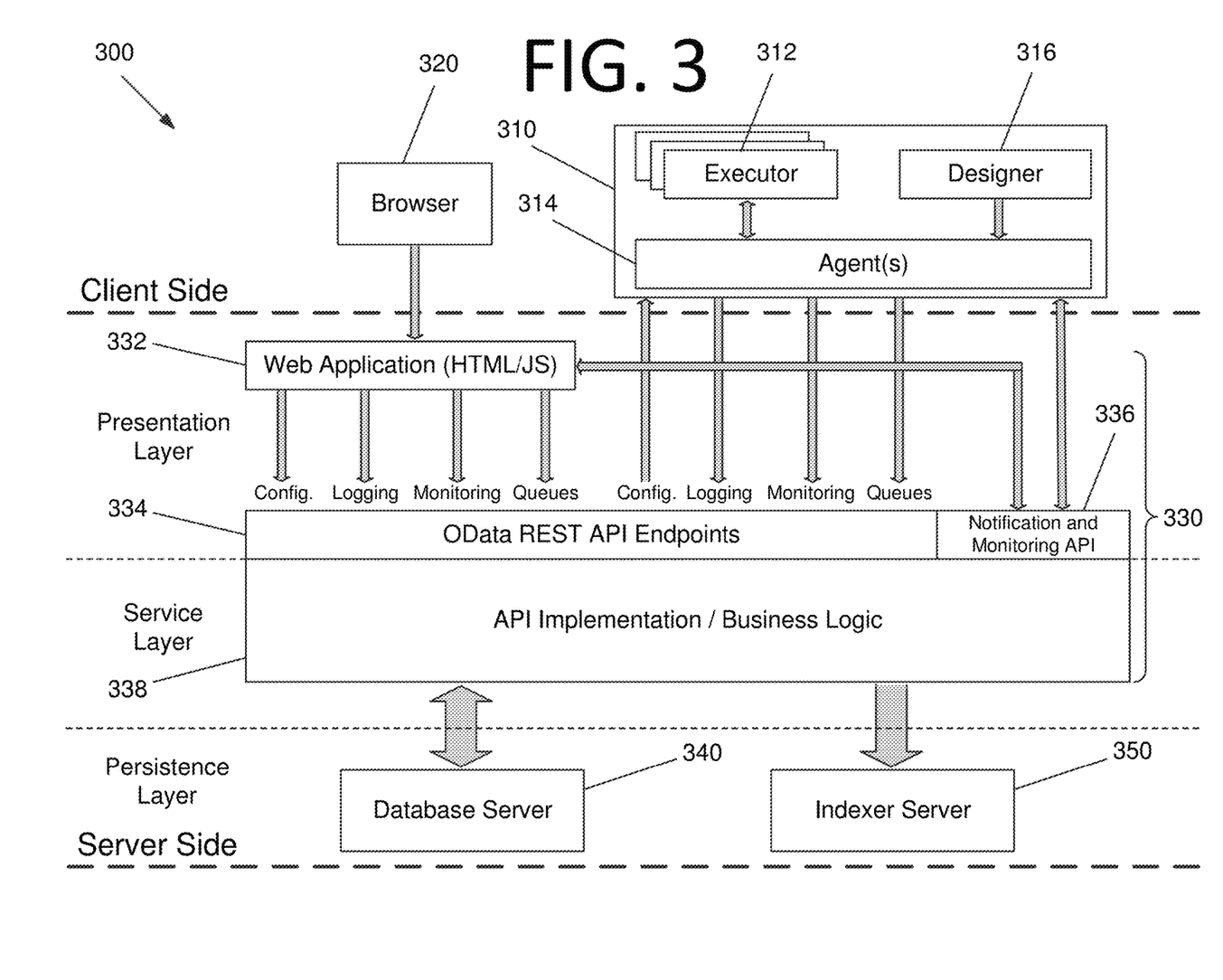
FIG. 3 is an architectural diagram illustrating a deployed RPA system, according to an embodiment of the present invention.

FIG. 3 is an architectural diagram illustrating a deployed RPA system 300, according to an embodiment of the present invention. In some embodiments, RPA system 300 may be, or may be a part of, RPA system 200 of FIG. 2. It should be noted that the client side, the server side, or both, may include any desired number of computing systems without deviating from the scope of the invention. On the client side, a robot application 310 includes executors 312, an agent 314, and a designer 316. However, in some embodiments, designer 316 may not be running on computing system 310. Executors 312 are running processes. Several business projects may run simultaneously, as shown in FIG. 3. Agent 314 (e.g., a Windows® service) is the single point of contact for all executors 312 in this embodiment. All messages in this embodiment are logged into conductor 330, which processes them further via database server 340, indexer server 350, or both. As discussed above with respect to FIG. 2, executors 312 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 314 is also responsible for sending the status of the robot (e.g., periodically sending a "heartbeat" message indicating that the robot is still functioning) and downloading the required version of the package to be executed. The communication between agent 314 and conductor 330 is always initiated by agent 314 in some embodiments. In the notification scenario, agent 314 may open a WebSocket channel that is later used by conductor 330 to send commands to the robot (e.g., start, stop, etc.).

On the server side, a presentation layer (web application 332, Open Data Protocol (OData) Representative State Transfer (REST) Application Programming Interface (API) endpoints 334, and notification and monitoring 336), a service layer (API implementation/business logic 338), and a persistence layer (database server 340 and indexer server 350) are included. Conductor 330 includes web application 332, OData REST API endpoints 334, notification and monitoring 336, and API implementation/business logic 338. In some embodiments, most actions that a user performs in the interface of conductor 320 (e.g., via browser 320) are performed by calling various APIs. Such actions may include, but are not limited to, starting jobs on robots, adding/removing data in queues, scheduling jobs to run unattended, etc. without deviating from the scope of the invention. Web application 332 is the visual layer of the server platform. In this embodiment, web application 332 uses Hypertext Markup Language (HTML) and JavaScript (JS). However, any desired markup languages, script languages, or any other formats may be used without deviating from the scope of the invention. The user interacts with web pages from web application 332 via browser 320 in this embodiment in order to perform various actions to control conductor 330. For instance, the user may create robot groups, assign packages to the robots, analyze logs per robot and/or per process, start and stop robots, etc.

In addition to web application 332, conductor 330 also includes service layer that exposes OData REST API endpoints 334. However, other endpoints may be included without deviating from the scope of the invention. The REST API is consumed by both web application 332 and agent 314. Agent 314 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 330. Queueing REST endpoints may be responsible for queues and queue item management, such as adding data to a queue, obtaining a transaction from the queue, setting the status of a transaction, etc.

Monitoring rest endpoints monitor web application 332 and agent 314. Notification and monitoring API 336 may be REST endpoints that are used for registering agent 314, delivering configuration settings to agent 314, and for sending/receiving notifications from the server and agent 314. Notification and monitoring API 336 may also use WebSocket communication in some embodiments.

The persistence layer includes a pair of servers in this embodiment—database server 340 (e.g., a SQL server) and indexer server 350. Database server 340 in this embodiment stores the configurations of the robots, robot groups, associated processes, users, roles, schedules, etc. This information is managed through web application 332 in some embodiments. Database server 340 may manages queues and queue items. In some embodiments, database server 340 may store messages logged by the robots (in addition to or in lieu of indexer server 350).

Indexer server 350, which is optional in some embodiments, stores and indexes the information logged by the robots. In certain embodiments, indexer server 350 may be disabled through configuration settings. In some embodiments, indexer server 350 uses ElasticSearch®, which is an open source project full-text search engine. Messages logged by robots (e.g., using activities like log message or write line) may be sent through the logging REST endpoint(s) to indexer server 350, where they are indexed for future utilization.

Figure 4:
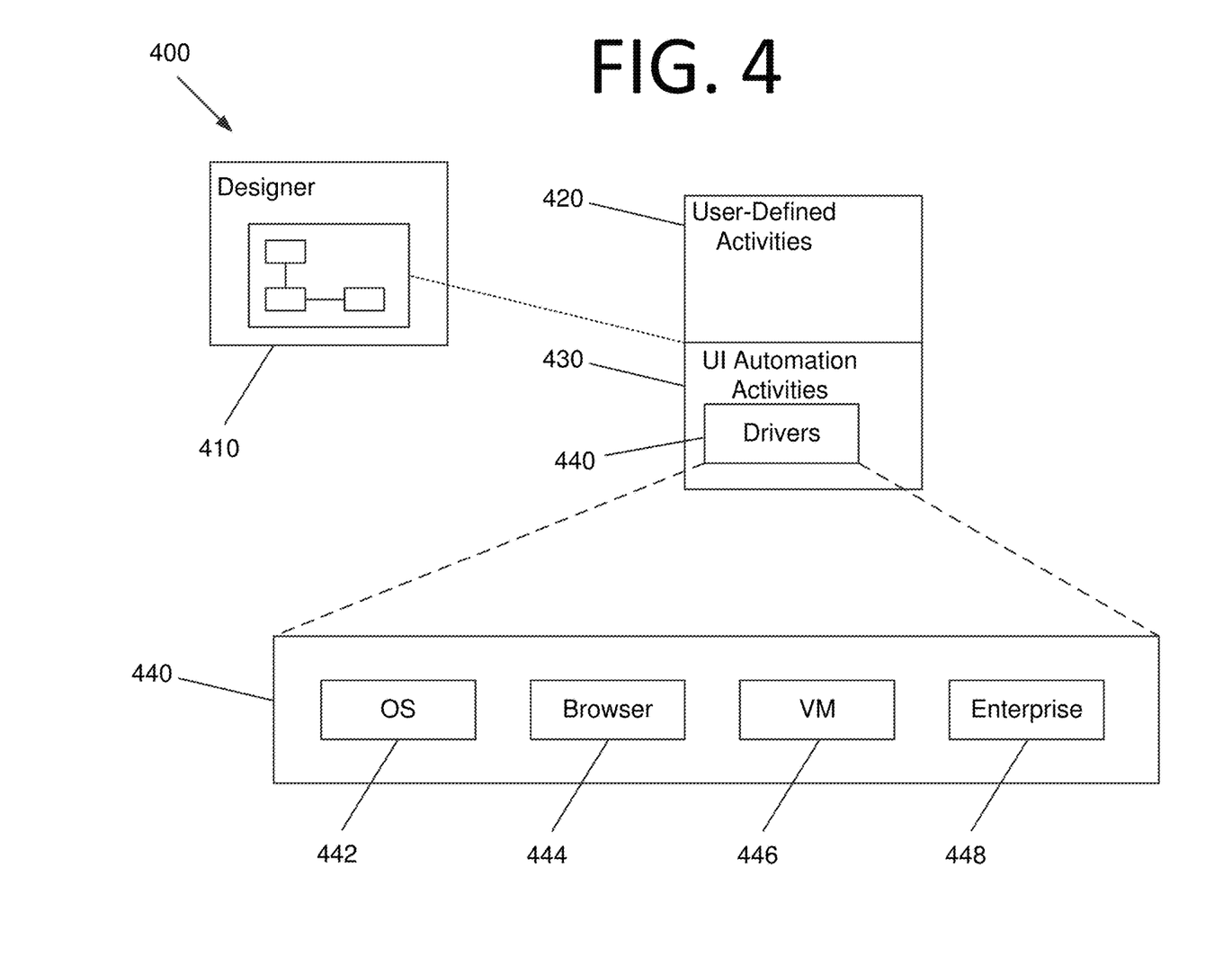
FIG. 4 is an architectural diagram illustrating the relationship between a designer, activities, and drivers, according to an embodiment of the present invention.

FIG. 4 is an architectural diagram illustrating the relationship 400 between a designer 410, activities 420, 430, and drivers 440, according to an embodiment of the present invention. Per the above, a developer uses designer 410 to develop workflows that are executed by robots. Workflows may include user-defined activities 420 and UI automation activities 430. Some CV activities may include, but are not limited to, click, type, get text, hover, element exists, refresh scope, highlight, etc. Click in some embodiments identifies an element using CV, OCR, fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 410. However, any number and/or type of activities may be available without deviating from the scope of the invention.

UI automation activities 430 are a subset of special, lower level activities that are written in lower level code (e.g., CV activities) and facilitate interactions with the screen. UI automation activities 430 facilitate these interactions via drivers 440 that allow the robot to interact with the desired software. For instance, drivers 440 may include OS drivers 442, browser drivers 444, VM drivers 446, enterprise application drivers 448, etc.

Drivers 440 may interact with the OS at a low level looking for hooks, monitoring for keys, etc. They may facilitate integration with Chrome®, IE®, Citrix®, SAP®, etc. For instance, the "click" activity performs the same role in these different applications via drivers 440.

Figure 5:
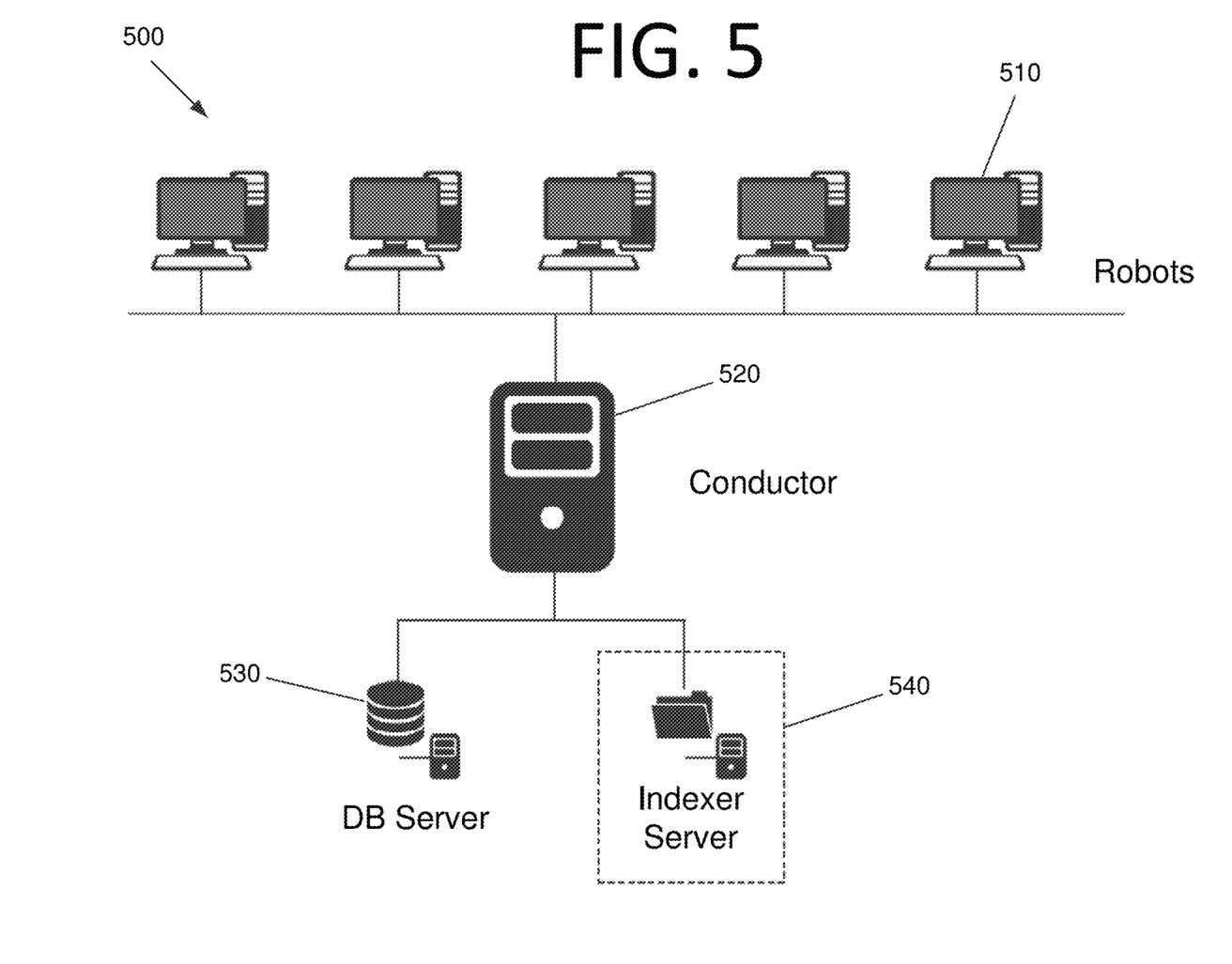
FIG. 5 is an architectural diagram illustrating an RPA system, according to an embodiment of the present invention.

FIG. 5 is an architectural diagram illustrating an RPA system 500, according to an embodiment of the present invention. In some embodiments, RPA system 500 may be or include RPA systems 200 and/or 300 of FIGS. 2 and/or 3. RPA system 500 includes multiple client computing systems 510 running robots. Computing systems 510 are able to communicate with a conductor computing system 520 via a web application running thereon. Conductor computing system 520, in turn, is able to communicate with a database server 530 and an optional indexer server 540.

With respect to FIGS. 3 and 5, it should be noted that while a web application is used in these embodiments, any suitable client/server software may be used without deviating from the scope of the invention. For instance, the conductor may run a server-side application that communicates with non-web-based client software applications on the client computing systems.

Figure 6:
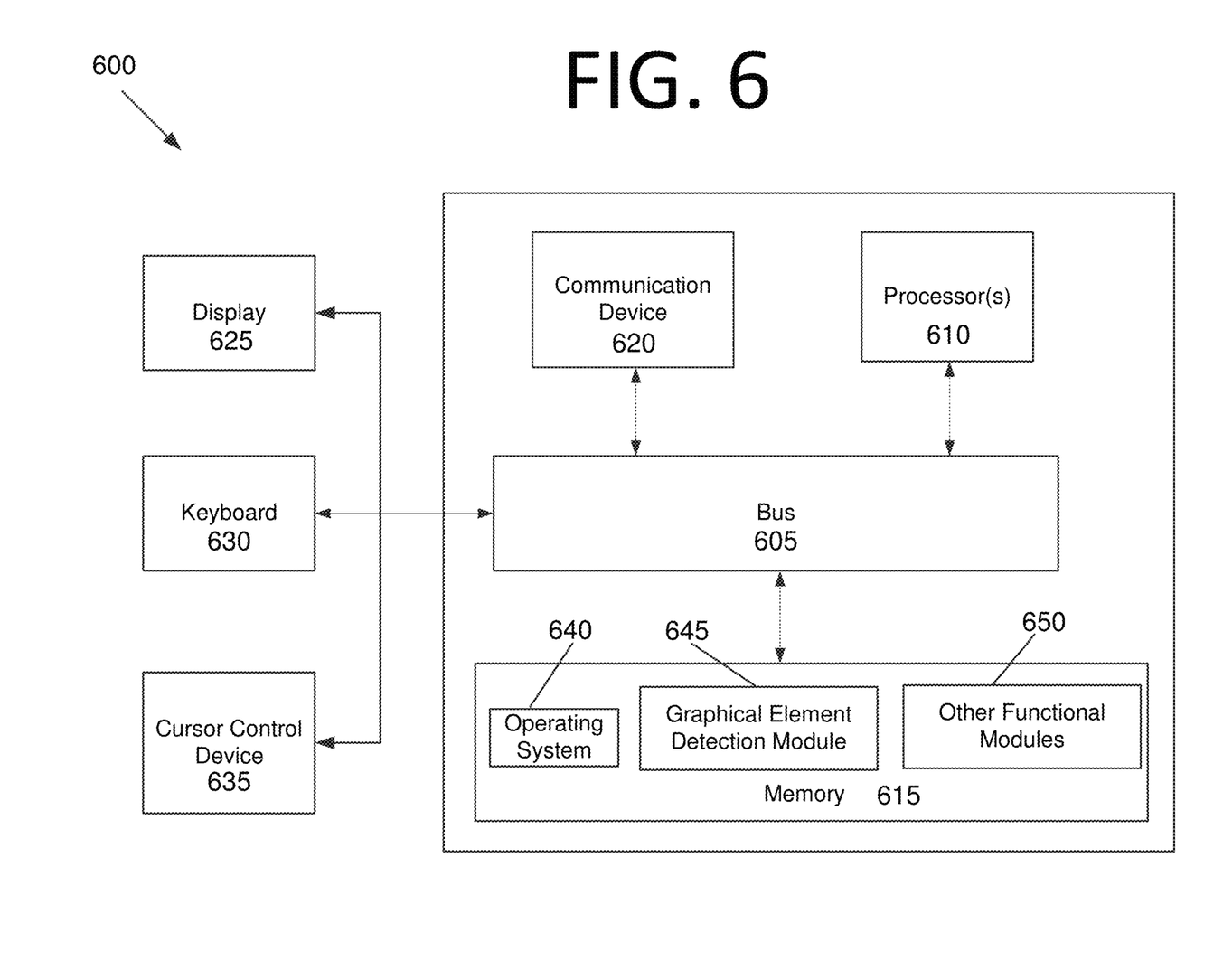
FIG. 6 is an architectural diagram illustrating a computing system configured to detect UI elements in an RPA system using CNNs, according to an embodiment of the present invention.

FIG. 6 is an architectural diagram illustrating a computing system 600 configured to detect UI elements in an RPA system using CNNs, according to an embodiment of the present invention. In some embodiments, computing system 600 may be one or more of the computing systems depicted and/or described herein. Computing system 600 includes a bus 605 or other communication mechanism for communicating information, and processor(s) 610 coupled to bus 605 for processing information. Processor(s) 610 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 610 may also have multiple processing cores, and at least some of the cores may be configured to perform specific functions. Multi-parallel processing may be used in some embodiments. In certain embodiments, at least one of processor(s) 610 may be a neuromorphic circuit that includes processing elements that mimic biological neurons. In some embodiments, neuromorphic circuits may not require the typical components of a Von Neumann computing architecture.

Computing system 600 further includes a memory 615 for storing information and instructions to be executed by processor(s) 610. Memory 615 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 610 and may include volatile media, non-volatile media, or both. The media may also be removable, non-removable, or both.

Additionally, computing system 600 includes a communication device 620, such as a transceiver, to provide access to a communications network via a wireless and/or wired connection. In some embodiments, communication device 620 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 620 may include one or more antennas that are singular, arrayed, phased, switched, beamforming, beamsteering, a combination thereof, and or any other antenna configuration without deviating from the scope of the invention.

Processor(s) 610 are further coupled via bus 605 to a display 625, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 625 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 630 and a cursor control device 635, such as a computer mouse, a touchpad, etc., are further coupled to bus 605 to enable a user to interface with computing system. However, in certain embodiments, a physical keyboard and mouse may not be present, and the user may interact with the device solely through display 625 and/or a touchpad (not shown). Any type and combination of input devices may be used as a matter of design choice. In certain embodiments, no physical input device and/or display is present. For instance, the user may interact with computing system 600 remotely via another computing system in communication therewith, or computing system 600 may operate autonomously.

Memory 615 stores software modules that provide functionality when executed by processor(s) 610. The modules include an operating system 640 for computing system 600. The modules further include a graphical element detection module 645 that is configured to perform all or part of the processes described herein or derivatives thereof. Computing system 600 may include one or more additional functional modules 650 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 7:
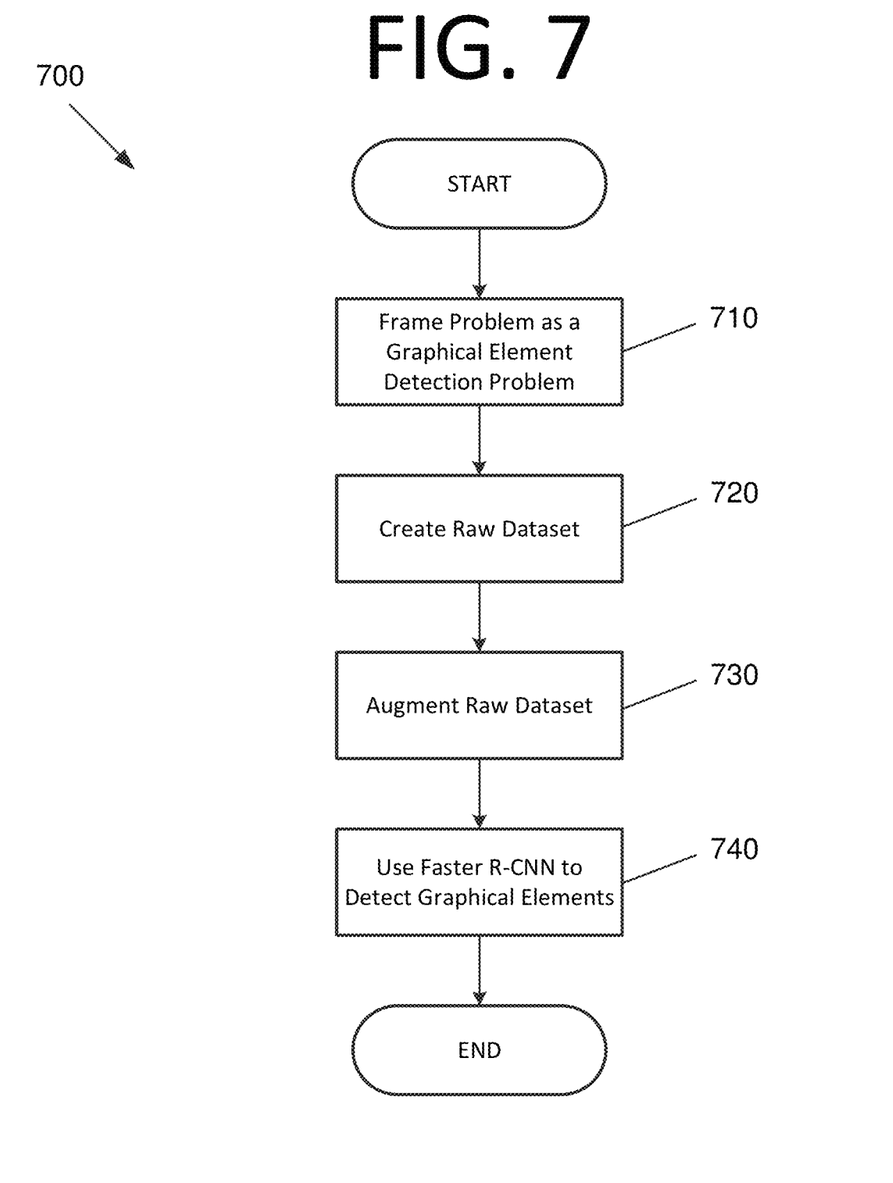
FIG. 7 is a flowchart illustrating a process for training a neural network, according to an embodiment of the present invention.

FIG. 7 is a flowchart illustrating a process 700 for training a neural network, according to an embodiment of the present invention. The process begins with framing a problem as a graphical element detection problem at 710. Next, a raw dataset is created at 720. The raw dataset is created in some embodiments by collecting images (i.e., screenshots of different application user interfaces) directly from the environment on which the CNN will operate. In some embodiments, the raw dataset includes screenshots from widely varying applications in an attempt to make the trained algorithm more robust. The raw dataset may also be created from synthetic data that provides images that are similar to those from real screenshots.

Synthetic data may be created in some embodiments by a program that generates other programs. The interfaces of the generated programs may then be scraped to obtain "screenshots." In some embodiments, the interfaces may look similar to desired software applications, such as enterprise resource planning (ERP) systems.

The raw dataset is then augmented at 730, creating an augmented dataset. The augmented dataset is created from the raw dataset in order to create additional datapoints in addition to the raw datapoints to train the neural network, and may include the raw dataset as well. As a nonlimiting example for visualization purposes, consider the scenario of collecting five images of a cat as raw data. Augmented data may be created by modifying the cat images in various ways that include, but are not limited to, flipping images horizontally, changing colors, artificially adding noise, artificially adding lighting, or any combination thereof. This helps to simulate scenarios that may happen in the real world. As such, the augmented dataset provides more datapoints for the neural network, making it more robust to real world scenarios, once trained.

In some embodiments, the dataset is augmented using channel randomization, hue shift, color inversion, random cropping, random scaling, blurring of images, or any combination thereof. Channel randomization makes the CNN robust to different color schemes. Channel randomization involves changing channel order (e.g., converting red into blue), resulting in new images and helping the network to understand colors. Hue shift and color inversion also make the network more robust to different color schemes. The latter may be especially beneficial since most UIs have white or dark themes.

Random cropping helps to achieve the translation effect due to the anchor stride and network convolutions strides. This assists in solving the intrinsic problem of strides in the architecture. Random cropping may be performed by overlaying a substantial number of rectangles (e.g., dozens of rectangles), which are usually laid out as a grid and then matched with actual labels. If a match occurs, the cropped image is taken as a positive example to train the network. If, however, the match does not occur, the cropped image is used as negative example to train the network.

The anchors have a granularity (scale) and a stride distance between the boxes. Thus, if there is a check box between two text boxes, for example, the algorithm in some embodiments will not miss it. The proposed network can be made to be sensitive to even small translations (e.g., a four pixel translation).

In some implementations, different cropping techniques may be used for different controls. For example, to identify a graphical element that is an image, it may be cropped at the bottom. Similarly, tables may be adjusted by size and other general text may be cropped in the middle in some embodiments. Using different cropping techniques may yield better results in some embodiments, but this may not be known beforehand.

Random scaling may allow coverage of a wider part of the real-life distribution of different systems and applications. For example, a button rendered in 800×600 resolutions may have 16×16 pixels. However, when the same button is rendered in a 4 k monitor, number of pixels in the button area will be considerably higher. The neural network may be trained for different scales using this approach. Blurring of images may also be used to make the network more robust to different compression and resize blurs that can occur in actual implementations.

After the augmented dataset is produced, a Faster R-CNN architecture designed for graphical element detection is used to detect graphical elements at 740. In some embodiments, the Faster R-CNN architecture is modified to be suitable for detecting small UI graphical elements and/or improving graphical element detection accuracy by making the algorithm more robust to changes in the UI. For example, image resizing may be bypassed. Conventional Faster R-CNN resizes to a fixed shape, but some embodiments do not do this. Atrous convolutions may be used to assist in finding larger UI elements and to take more context into account. Also, variable proposal sizes may be used. For example, it is typically expected to find more graphical elements in a larger screenshot than in a smaller one.

Faster R-CNN was found to be the most effective architecture during comparative testing with other architectures. However, any other suitable architecture, such as SSD, RetinaNet, YOLO, etc., may be modified without deviating from the scope of the invention. Also, while the RPN backbone of some embodiments is ResNet-101, having the fastest performance and best wmAP during testing, any desired RPN backbone may be used without deviating from the scope of the invention.

The Faster R-CNN implementation of some embodiments may be the Tensorflow object detection API. In such embodiments, the momentum optimizer with a learning rate that roughly follows an exponential decay rule may be used. Due to the range of the object sizes, we made the following decisions were made with respect to a practical implementation. It was decided to use a dilated convolution in the ResNet-101 backbone to increase the receptive field without incurring a model size penalty. For this, first_stage_atrous_rate was set to 2. The following anchor settings were also used: (1) a base size of width=64 and height=64; (2) a stride with width=8 and height=8; (3) scales of 0.25, 0.5, 1.0, and 2.0; and (4) aspect ratios of 0.5, 1.0, and 2.0. The number of proposals of both stages was set to 400. Proposals are a hyper-parameter for two stage detection networks.

The CNN architecture is only inherently invariant to translation if all of the strides are equal to 1. Otherwise, differences start to appear. Additionally, due to the stride of the anchors, even greater problems emerge with respect to translation. Thus, the dataset should be augmented to include translations.

In some embodiments, each time two boxes are compared, the intersection over the union or the intersection over the minimum is used with a given threshold. An adaptive threshold may be used in some embodiments that depends on the area of the box. For small graphical elements, a small threshold works well. However, for larger graphical elements, a larger threshold may be preferable.

Each prediction in some embodiments comes with a "confidence" that the network has with respect to that prediction. The threshold may be the minimum confidence take that prediction into account. For instance, if the minimum confidence is 70%, only predictions with at least that confidence value would be used in some embodiments. In certain embodiments, the confidence is computed dynamically as a function of precision/recall.

The model in some embodiments provides a fixed number of detected controls. Based on a precision/recall tradeoff, these proposals may be filtered with different thresholds for design time (i.e., when a developer is defining the automation) and at runtime (i.e., when the robot runs the automation on its own). At design time, a threshold may be used that maximizes precision (i.e., only graphical elements are shown that are believed to be accurately identified with a high degree of certainty). For example, a confidence of above 90% may be required in some embodiments as the high degree of certainly. However, any desired higher confidence may be used without deviating from the scope of the invention. In this manner, the chances that the graphical elements are found at runtime are high.

At runtime, however, a lower threshold may be used that maximizes recall. Thus, a larger number of potential graphical elements may be identified. Multi-anchor post-processing, such as that described in U.S. patent application Ser. No. 16/517,225, may then be used to help identify the desired controls even with low precision (high noise) detections.

Some embodiments realize various advantages over existing image recognition techniques. For instance, some embodiments provide more accurate recall (i.e., fewer UI elements are missed or misidentified). Some embodiments are more robust to UI theme changes and UI scaling. Certain embodiments can be incrementally improved by adding more data, as well as by adding architecture changes (e.g., changing the internal mechanics of the neural network, but still having the same input/output).

Figure 8:
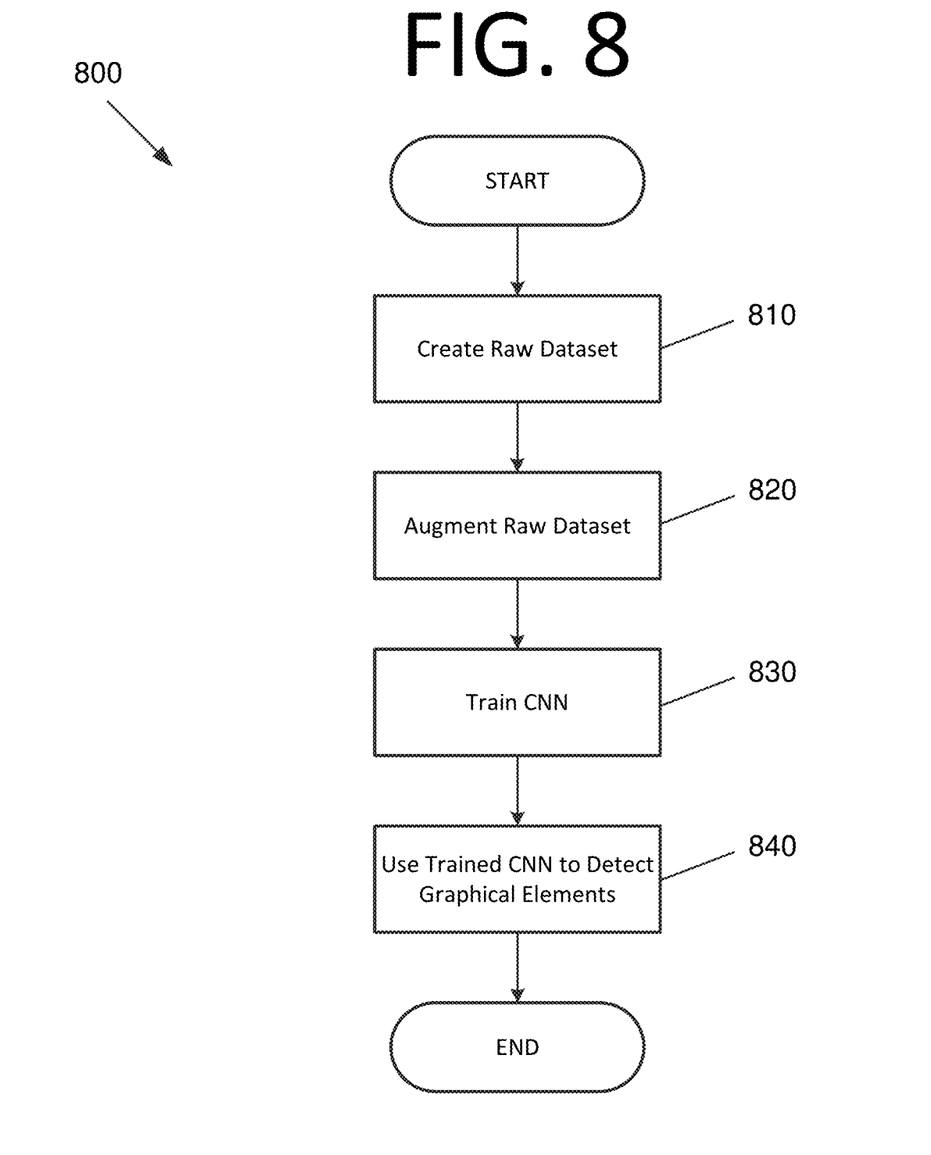
FIG. 8 is a flowchart illustrating a process for training a neural network, according to an embodiment of the present invention.

FIG. 8 is a flowchart illustrating a process 800 for training a neural network, according to an embodiment of the present invention. The process beings with creating a raw dataset by collecting images directly from an environment on which a CNN will operate at 810. In some embodiments, the raw dataset is created from synthetic data mimicking real screenshots.

Next, the raw dataset is augmented to produce an augmented dataset at 820. In some embodiments, the augmenting of the raw dataset includes flipping images horizontally, changing colors, artificially adding noise, artificially adding lighting, or any combination thereof. In certain embodiments, the augmenting of the raw data comprises using channel randomization, hue shift, color inversion, random cropping, random scaling, blurring of images, or any combination thereof. In some embodiments, the augmented dataset includes translations.

In embodiments where random cropping is used to produce cropped images, the augmenting of the raw dataset may include overlaying rectangles over the cropped image as a grid, matching the overlaid rectangles to actual labels, using the cropped image as a positive example to train the CNN when a match occurs, and using the cropped image as a negative example to train the CNN when a match does not occur. In certain embodiments, proposals are provided for each rectangle in the grid. The proposals include a scale and a stride distance, the stride distance defining a distance between the rectangles. In some embodiments, each time two rectangles are compared, an intersection over a union or an intersection over a minimum is used with a given threshold. In certain embodiments, the threshold is an adaptive threshold that depends on an area of a given rectangle. In some embodiments, different cropping techniques are used to identify at least two different graphical element types.

The CNN is then trained using the augmented dataset at 830. In some embodiments, the CNN includes a Faster R-CNN architecture. In certain embodiments, dilated convolution is used in the RPN backbone with two stages, different scales are used, and different aspect ratios are used.

Graphical elements are then detected in a UI using the trained CNN at 840. In some embodiments, the detecting of the graphical elements includes providing a fixed number of proposals for each graphical element. In certain embodiments, the proposals are filtered with different thresholds for design time and for runtime, the runtime threshold requiring a higher detection probability than the design time threshold.

The process steps performed in FIGS. 7 and 8 may be performed by a computer program, encoding instructions for the processor(s) to perform at least part of the process described in FIGS. 7 and 8, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 610 of computing system 600 of FIG. 6) to implement all or part of the process steps described in FIGS. 7 and 8, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable medium, the computer program configured to cause at least one processor to:
   create a raw dataset by collecting images directly from an environment on which a convolutional neural network (CNN) will operate;
   augment the raw dataset to produce an augmented dataset;
   train the CNN using the augmented dataset; and
   detect graphical elements in a user interface (UI) using the trained CNN.

2. The computer program of claim 1, wherein the raw dataset is created from synthetic data mimicking real screenshots.

3. The computer program of claim 1, wherein the augmenting of the raw dataset comprises flipping images horizontally, changing colors, artificially adding noise, artificially adding lighting, or any combination thereof.

4. The computer program of claim 1, wherein the augmenting of the raw data comprises using channel randomization, hue shift, color inversion, random cropping, random scaling, blurring of images, or any combination thereof.

5. The computer program of claim 1, wherein the CNN comprises a Faster Region-based Convolutional Neural Network (R-CNN) architecture with a region proposal network (RPN).

6. The computer program of claim 1, wherein the augmented dataset comprises translations.

7. The computer program of claim 6, wherein the trained CNN is sensitive to translations of four pixels.

8. The computer program of claim 1, wherein the computer program is further configured to cause the at least one processor to:
   apply different cropping techniques to at least two different types of controls.

9. The computer program of claim 1, wherein a lower detection threshold that maximizes recall is used at runtime than at design time.

10. The computer program of claim 1, wherein
    the detecting of the graphical elements comprises providing a fixed number of proposals for each graphical element, and
    the proposals are filtered with different thresholds for design time and for runtime, the runtime threshold having a higher detection probability than the design time threshold.

11. A computer-implemented method, comprising:
    augmenting, by a computing system, a raw dataset using channel randomization, hue shift, color inversion, random cropping, random scaling, blurring of images, or any combination thereof, to produce an augmented dataset;
    training a convolutional neural network (CNN), by the computing system, using the augmented dataset; and
    detecting graphical elements in a user interface (UI), by the computing system, using the trained CNN.

12. The computer-implemented method of claim 11, wherein random cropping is used to produce cropped images and the method further comprises:
    providing proposals for each rectangle in the grid, by the computing system.

13. The computer-implemented method of claim 12, wherein different cropping techniques are used to identify at least two different graphical element types.

14. The computer-implemented method of claim 12, wherein
    each time two rectangles are compared, an intersection over a union or an intersection over a minimum is used with a given threshold, and
    the threshold is an adaptive threshold that depends on an area of a given rectangle.

15. The computer-implemented method of claim 11, further comprising:
    creating the raw dataset, by the computing system, by collecting images directly from an environment on which the CNN will operate, wherein
    the raw dataset is created from synthetic data mimicking real screenshots, and
    the augmenting of the raw dataset comprises flipping images horizontally, changing colors, artificially adding noise, artificially adding lighting, or any combination thereof.

16. The computer-implemented method of claim 11, wherein
    the detecting of the graphical elements comprises providing a fixed number of proposals for each graphical element, and the proposals are filtered with different thresholds for design time and for runtime, the runtime threshold having a higher detection probability than the design time threshold.

17. A system, comprising:
memory storing computer program instructions; and
at least one processor configured to execute the computer program instructions, the at least one processor configured to:
  detect graphical elements in a user interface (UI) using a Faster Region-based Convolutional Neural Network (R-CNN) architecture with a region proposal network (RPN) backbone, the detection comprising overlaying rectangles over an image as a grid and providing a predetermined number of proposals for each rectangle in the grid, wherein
each time two rectangles are compared, an intersection over a union or an intersection over a minimum is used with a given threshold, and
the threshold is an adaptive threshold that depends on an area of a given rectangle.

18. The system of claim 17, wherein the proposals are filtered with different thresholds for design time and for runtime, the runtime threshold having a higher detection probability than the design time threshold.

19. The system of claim 17, wherein the at least one processor is further configured to:
  create a raw dataset by collecting images directly from an environment on which the Faster R-CNN will operate; and
  augment the raw dataset to produce an augmented dataset, wherein
  the raw dataset is created from synthetic data mimicking real screenshots, and
  the augmenting of the raw dataset comprises flipping images horizontally, changing colors, artificially adding noise, artificially adding lighting, or any combination thereof.

20. The system of claim 19, wherein the R-CNN architecture is sensitive to translations of four pixels.

* * * * *